(No Model.)

F. Z. HICKS.
EAR AND BAIL.

No. 434,829.  Patented Aug. 19, 1890.

WITNESSES:
J Henry Pickrath
C. Sedgwick

INVENTOR:
F. Z. Hicks
BY
Munn & Co.
ATTORNEYS

UNITED STATES PATENT OFFICE.

FRANKLIN Z. HICKS, OF RAPID CITY, SOUTH DAKOTA.

EAR AND BAIL.

SPECIFICATION forming part of Letters Patent No. 434,829, dated August 19, 1890.

Application filed February 26, 1890. Serial No. 341,837. (No model.)

*To all whom it may concern:*

Be it known that I, FRANKLIN Z. HICKS, of Rapid City, in the county of Pennington and State of South Dakota, have invented a new and Improved Ear and Bail for Culinary Vessels, of which the following is a specification, reference being had to the annexed drawings, forming a part thereof, in which—

Figure 1:
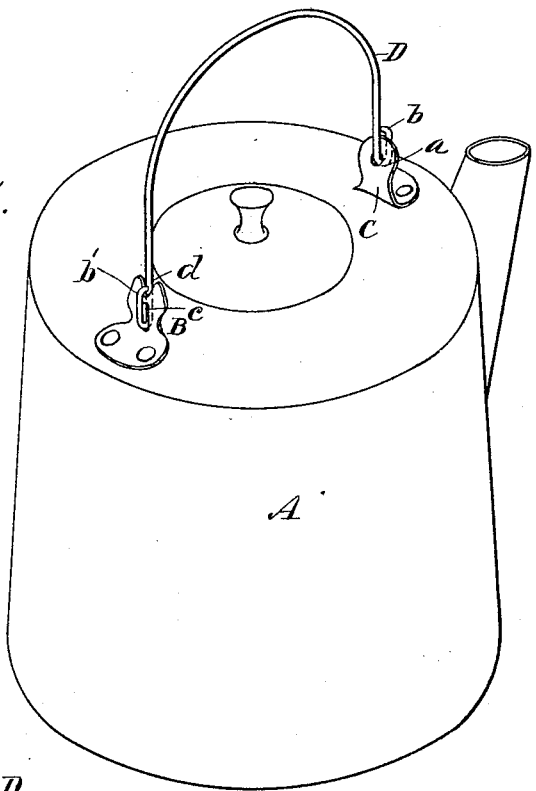
Figure 2:
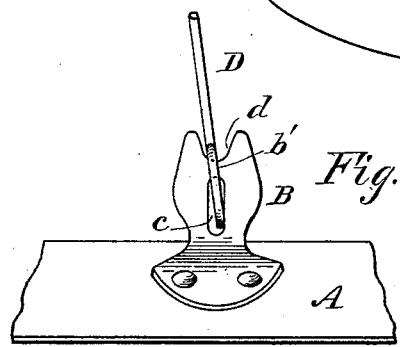
Figure 3:
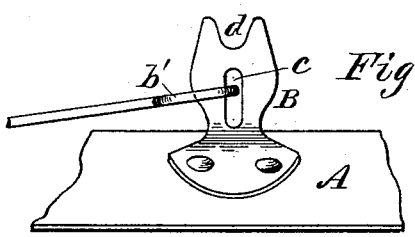

Figure 1 is a perspective view of a tea-kettle provided with my improved ear and bail. Figs. 2 and 3 are side elevations of one of the bail-ears, showing the bail in different positions.

Similar letters of reference indicate corresponding parts in all the views.

The object of my invention is to provide a bail which may be retained in an upright position or folded down upon the top of the vessel, as circumstances may require.

My invention consists in the construction and combination of parts hereinafter described and claimed.

To the top of the vessel A are attached the ears B C by rivets, in the usual way. The ear C, which is of the ordinary form, is provided with an aperture $a$ for receiving the eye $b$, formed on the end of the bail D. The ear B is elongated and provided with an oblong longitudinal slot $c$, and with a notch $d$ in the upper edge thereof. The eye $b'$ upon the end of bail D is received by the slot $c$, and when the bail is in an upright position the upper part of the eye $b'$ drops into the notch $d$, as shown in Figs. 1 and 2, and is held by the notch $d$ in an upright position. When it is desired to fold the bail down upon the top of the kettle, it is lifted so as to disengage the eye from the notch $d$, when it may be turned down, as shown in Fig. 3.

Having thus described my invention, I claim as new and desire to secure by Letters Patent—

1. As a new article of manufacture, a bail-ear B, provided with a notch $d$ in its upper edge and a vertical slot $c$ below the notch, substantially as set forth.

2. The combination, with the ear having a notch $d$ in its upper edge and a vertical slot below the notch, of a bail having its end extending through the said slot and upward and inward over the upper edge to form the loop $b'$, the upper and lower ends of the loop being adapted to rest, respectively, in the said notch and lower end of the vertical slot to hold the bail raised, substantially as set forth.

FRANKLIN Z. HICKS.

Witnesses:
CHAUNCEY L. WOOD,
LEVI MCGEE.